United States Patent Office 3,642,687
Patented Feb. 15, 1972

3,642,687
CURABLE SHAPE-RETAINING MOLDING
MATERIALS
Herbert Naarmann and Benedikt Georgii, Ludwigshafen, Germany, assignors to Badische Anilin- & Soda-Fabrik Aktiengesellschaft, Ludwigshafen (Rhine), Germany
No Drawing. Filed Dec. 3, 1969, Ser. No. 881,900
Claims priority, application Germany, Dec. 13, 1968,
P 18 14 494.0
Int. Cl. C08c 11/00; C08d 9/02
U.S. Cl. 260—41.5 R
3 Claims

ABSTRACT OF THE DISCLOSURE

Shape-retaining molding material comprising high molecular weight and low molecular weight diene polymers, gypsum and free-radical-forming crosslinking agents. The material may be cured by means of heat or light. It may be used as a sealing material in the building industry and as a modeling material in the toy industry.

---

This invention relates to curable shape-retaining molding materials comprising high molecular weight and low molecular weight diene polymers, gypsum and free-radical-forming crosslinking agents.

It is known that natural or synthetic diene polymers can be mixed with fillers such as chalk, silicon dioxide or carbon black and that these mixtures can be cured by means of crosslinking agents such as sulfur or peroxides.

In the case of all prior art compositions of this type, the crosslinking has to be carried out in molding machines because the compositions do not retain their shape. Most of them exhibit cold flow i.e. they flow even at room temperature; at the usual cross-linking temperatures all of them lose their shape completely.

We have now found that mixtures of:

(A) 3 to 15% by weight of a high molecular weight diene polymer having a K value of more than 80;
(B) 10 to 35% by weight of a low molecular weight diene polymer having a K value of less than 30;
(C) 60 to 85% by weight of gypsum; and
(D) 0.2 to 3% by weight of a free-radical-forming crosslinking agent are curable molding materials which retain their shape.

Both natural and synthetic rubbers are suitable as the rubber component (A). Synthetic rubber may be prepared by polymerization of butadiene or isoprene, if desired in admixture, with up to 40% of comonomers by any polymerization method. The diene polymer should have a molecular weight of more than 150,000; this is equivalent to a K value of more than 80 (measured in 1% toluene solution according to Fikentscher, Cellulosechemie 13 (1932), page 60). The rubber component is responsible for the stability of the material. It is used in an amount of from 3 to 15% by weight. If too little high molecular weight rubber is used, the material loses its inner coherence and breaks apart.

Low molecular weight diene polymers or copolymers having at least 80% of butadiene or isoprene are suitable as the oily component (B). It is preferred to use polybutadiene oils which can be prepared by emulsion or solution polymerization. They should have a molecular weight of from 2500 to 25,000, whch is equivalent to K values of from 15 to 30 (3% in toluene).

Low molecular weight diene polymers are in a liquid highly viscous, i.e. oily, form. They impart plasticity to the mixture; if too little of them is used, the mixtures have inadequate plasticity; when too much oily constituent is used, the mixtures become too sticky. Amounts of from 10 to 35% by weight are therefore used.

Gypsum is used as the filler (C) for the curable compositions. It may be used in any form, as dihydrate $CaSO_4 \cdot 2H_2O$, as hemihydrate $CaSO_4 \cdot \frac{1}{2}H_2O$ or as anhydrite $CaSO_4$. Purity is of no importance; both analytically pure calcium sulfate and commercial gypsum having a purity of about 90% may be used. It is advantageously used in the form of powder having a particle diameter of less than 0.1 mm.

The curable compositions contain from 60 to 85% by weight of gypsum. If less than 60% of gypsum is used, the mixtures lose their shape-retaining properties.

The compositions are cured by crosslinking of the polydiene chains with one another under the influence of the free-radical-forming catalyst (D).

All conventional compounds forming free radicals, for example peroxides, persulfates or azo compounds, are suitable as component (D). They are added in amounts of from 0.2 to 3% by weight. The curable compositions may contain up to 10% by weight of colorants, for example inorganic pigments or phthalocyanines.

The components may be mixed in kneaders or extruders of conventional design. From five to fifteen minutes is generally enough for homogeneous mixing. The curable compositions may be used as non-shrinking, non-swelling sealing compounds in the building industry, for example for sealing joints or windows. As compared with conventional glazier's putty they have the advantage that they cure more quickly, do not smear and do not exude any volatile constituents.

Curing of the sealing compounds is effected by light. After a few weeks the mixtures have lost their plasticity and have become hard and somewhat elastic.

The compositions according to this invention may also be used as modeling compositions in the toy and hobby industries and also for artistic purposes. They can easily be molded and are easy to work because of their plasticity. Curing may be carried out in a simple way by heating to temperatures above 100° C., preferably at from 150° to 250° C. The crosslinking process is over after only about ten to thirty minutes. The compositions keep their shape even when heated to 400° C.

The invention is illustrated by the following examples, in which parts and percentages are by weight.

EXAMPLE 1

1200 parts of gypsum is mixed with 75 parts of a polybutadiene having a K value of 98 (1% toluene), a 1,2-vinyl fraction of 10% and a 1,4-cis fraction of 35% and with 230 parts of a low molecular weight polybutadiene having a K value of 21 (3% in toluene) with an addition of 10 parts of 3-phenyl-3-tertiary-butyl peroxyphthalide and kneaded in a kneader for ten minutes at 40° C.

If the mixture is made into a circular column having a height of 10 cm. and a diameter of 1 cm., no change in shape can be observed after ten days in the uncrosslinked condition; likewise, after crosslinking at 170° C. within twenty minutes, no change in the dimensions can be observed.

Comparative experiment A.—The procedure of Example 1 is followed but gypsum is replaced by whiting. A mixture is obtained which exhibits cold flow in the uncrosslinked condition; during crosslinking the column turns into a cone having a height of 7 cm.

Comparative experiment B.—The procedure of Example 1 is followed but gypsum is replaced by a coated chalk known under the registered trademark OMYA BSH. A mixture is obtained which exhibits cold flow in the uncrosslinked condition; the column turns into a cone having a height of 6.3 cm. during crosslinking.

Comparative experiment C.—The procedure of Example 1 is followed but gypsum is replaced by silicon dioxide (grade sold under the registered trademark Aerosil). A mixture is obtained which exhibits cold flow in the uncrosslinked condition; the column turns into a cone having a height of 6.1 cm. during crosslinking.

Comparative experiment D.—The procedure of Example 1 is followed but gypsum is replaced by carbon black (type CK3). A mixture is obtained which is not homogeneous in the uncrosslinked condition because the amount of binder is not sufficient; the column flows during crosslinking and gives a porous deformed body.

Comparative experiment E.—The procedure of Example 1 is followed but the low molecular weight polybutadiene is replaced by linseed oil. A mixture is obtained which exhibits cold flow in the uncrosslinked condition; the column turns into a cone having a height of 4.5 cm. during crosslinking.

EXAMPLES 2 TO 12

The procedure described in Example 1 is followed but the phthalide peroxide is replaced by other peroxides. The following relationships exist between the type and amount of peroxide and the crosslinking period and the crosslinking temperature. In all cases the mixtures retain their shape. In Examples 11 and 12, where no crosslinking initiator is used, there is no crosslinking.

In the table:

Ex=Example
PP=parts of peroxide
CLT=crosslinking temperature in ° C.
CLP=crosslinking period in minutes

| Ex. | Type of peroxide | PP | CLT | CLP |
|---|---|---|---|---|
| 2 | Ditertiary-butyl peroxide | 10 | 150 | 20 |
| 3 | do | 20 | 150 | 14 |
| 4 | Hexaphenylethane | 30 | 170 | 20 |
| 5 | p-Menthane hydroperoxide | 5 | 200 | 20 |
| 6 | Poly-p-diisopropylbenzene | 25 | 200 | 30 |
| 7 | Dicumyl peroxide | 20 | 170 | 15 |
| 8 | Pinane hydroperoxide | 30 | 170 | 10 |
| 9 | 3-p-tolyl-3-tert-butylphthalide peroxide | 20 | 200 | 15 |
| 10 | 2,5-dimethylhexane-2,5-dihydroperoxide | 20 | 200 | 20 |
| 11 | | | 150 | (¹) |
| 12 | | | 200 | (¹) |

¹ No crosslinking after thirty minutes.

EXAMPLES 13 TO 20

The procedure described in Example 1 is followed but the rubber component is varied. The following results are obtained. K values in each case are determined in toluene in 0.1% solution.

| Ex. | Rubber component | K value | Amounts in parts |
|---|---|---|---|
| 13 | Natural rubber | 104 | 70 |
| 14 | do | 87 | 80 |
| 15 | Copolymer of butadiene and 23% by weight of styrene. | 94 | 75 |
| 16 | Copolymer of butadiene and 20% by weight of n-butyl acrylate. | 197 | 75 |
| 17 | Copolymer of butadiene and 26% by weight of vinyl methyl ketone. | 96 | 75 |
| 18 | Copolymer of isoprene and 5% by weight of acrylic acid. | 98 | 50 |
| 19 | Copolymer of isoprene and 10% by weight of acrylamide. | 93 | 55 |
| 20 | Block copolymer of α-methylstyrene and butadiene. | 60 | 50 |

In all Examples 13 to 20, the products obtained after crosslinking retain their shape; neither swelling nor shrinkage occurs during curing.

We claim:
1. A curable composition which retains its shape, comprising:
   (A) 3 to 15% by weight of a high molecular weight diene polymer having a K value of more than 80;
   (B) 10 to 35% by weight of a lower molecular weight diene polymer having a K value of less than 30;
   (C) 60 to 85% by weight of gypsum; and
   (D) 0.2 to 3% by weight of a crosslinking agent which forms free radicals.

2. A curable composition as claimed in claim 1 wherein component (C) is used in the form of a powder having a particle diameter of less than 0.1 mm.

3. A curable composition as claimed in claim 1 which also contains up to 10% of a colorant.

References Cited

UNITED STATES PATENTS 2,727,185  10/1955  Schulze et al. _____ 260—894

FOREIGN PATENTS 740,039  8/1966  Canada _____ 260—894

OTHER REFERENCES

Rubber World—Materials and Compound Ingredients for Rubber, 1968 Ed., New York, 1968, p. 270. TS 1890 I 53.

MORRIS LIEBMAN, Primary Examiner
H. H. FLETCHER, Assistant Examiner

U.S. Cl. X.R.
106—2.88 B; 260—894

PO-1050
(5/69)

UNITED STATES PATENT OFFICE
CERTIFICATE OF CORRECTION

Patent No. 3,642,687      Dated February 15, 1972

Inventor(s) Herbert Naarmann and Benedikt Georgii

It is certified that error appears in the above-identified patent and that said Letters Patent are hereby corrected as shown below:

Column 4, line 36, "2,727,185" should read -- 2,721,185 --; line 41, "Compound" should read -- Compounding --.

Signed and sealed this 19th day of September 1972.

(SEAL)
Attest:

EDWARD M. FLETCHER, JR.            ROBERT GOTTSCHALK
Attesting Officer                 Commissioner of Patents